(12) United States Patent
Setomaru et al.

(10) Patent No.: US 12,282,034 B2
(45) Date of Patent: Apr. 22, 2025

(54) AUTOMATIC ANALYSIS DEVICE

(71) Applicant: HITACHI HIGH-TECH CORPORATION, Tokyo (JP)

(72) Inventors: Takeshi Setomaru, Tokyo (JP); Hiroyuki Mishima, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 850 days.

(21) Appl. No.: 17/312,163

(22) PCT Filed: Dec. 13, 2019

(86) PCT No.: PCT/JP2019/048887
§ 371 (c)(1),
(2) Date: Jun. 9, 2021

(87) PCT Pub. No.: WO2020/162042
PCT Pub. Date: Aug. 13, 2020

(65) Prior Publication Data
US 2022/0018861 A1    Jan. 20, 2022

(30) Foreign Application Priority Data
Feb. 8, 2019 (JP) .................... 2019-021154

(51) Int. Cl.
*G01N 35/00* (2006.01)
*G01N 35/04* (2006.01)

(52) U.S. Cl.
CPC ... *G01N 35/0092* (2013.01); *G01N 35/00663* (2013.01); *G01N 35/04* (2013.01)

(58) Field of Classification Search
CPC ......... G01N 35/0092; G01N 35/00663; G01N 35/04; G01N 2035/00326;
(Continued)

(56) References Cited

U.S. PATENT DOCUMENTS

| 7,842,237 B1* | 11/2010 | Shibuya | ............... G01N 35/026 422/65 |
| 11,268,971 B2 | 3/2022 | Makino et al. | |

(Continued)

FOREIGN PATENT DOCUMENTS

| JP | H02-77651 A | 3/1990 |
| JP | H11-148940 A | 6/1999 |

(Continued)

OTHER PUBLICATIONS

Office Action, mailed May 5, 2023, for Chinese Application No. 201980089877.3 (without English translation).
(Continued)

*Primary Examiner* — P. Kathryn Wright
*Assistant Examiner* — Curtis A Thompson
(74) *Attorney, Agent, or Firm* — Baker Botts L.L.P.

(57) ABSTRACT

Provided are a device and a method capable of determining an optimal retrieving condition of a specimen rack according to various situations, when an error occurs in any specimen among a plurality of specimens mounted on the specimen rack. When the error occurs in a specimen accommodated in a specimen container mounted on the specimen rack, conveyance of the specimen rack is controlled on the basis of information about the specimen having the error and a specimen accommodated in another specimen container on the specimen rack on which the specimen container with the specimen accommodated therein is mounted, and the retrieval condition of the specimen rack.

14 Claims, 11 Drawing Sheets

(58) Field of Classification Search
CPC ......... G01N 35/00871; G01N 35/1009; G01N 2035/0094; G01N 35/0095; G01N 2035/0093; G01N 2035/0096; G01N 2035/0097
See application file for complete search history.

(56) References Cited

U.S. PATENT DOCUMENTS

| | | | |
|---|---|---|---|
| 2011/0054800 A1* | 3/2011 | Mizumoto | G01N 35/00584 713/323 |
| 2011/0160899 A1* | 6/2011 | Tatsutani | G01N 35/0092 700/218 |
| 2012/0036944 A1 | 2/2012 | Chida et al. | |

FOREIGN PATENT DOCUMENTS

| | | | |
|---|---|---|---|
| JP | 2011242264 A | * | 12/2011 |
| JP | 5174629 B2 | * | 4/2013 |
| JP | 2014-085150 A | | 5/2014 |
| JP | 2015-141024 A | | 8/2015 |
| JP | 2016-014686 A | | 1/2016 |
| WO | WO 2010/122718 A1 | | 10/2010 |
| WO | WO 2018/163674 A1 | | 9/2018 |

OTHER PUBLICATIONS

International Search Report, mailed Feb. 18, 2020, for International Application No. PCT/JP2019/048887.

* cited by examiner

[FIG. 1]
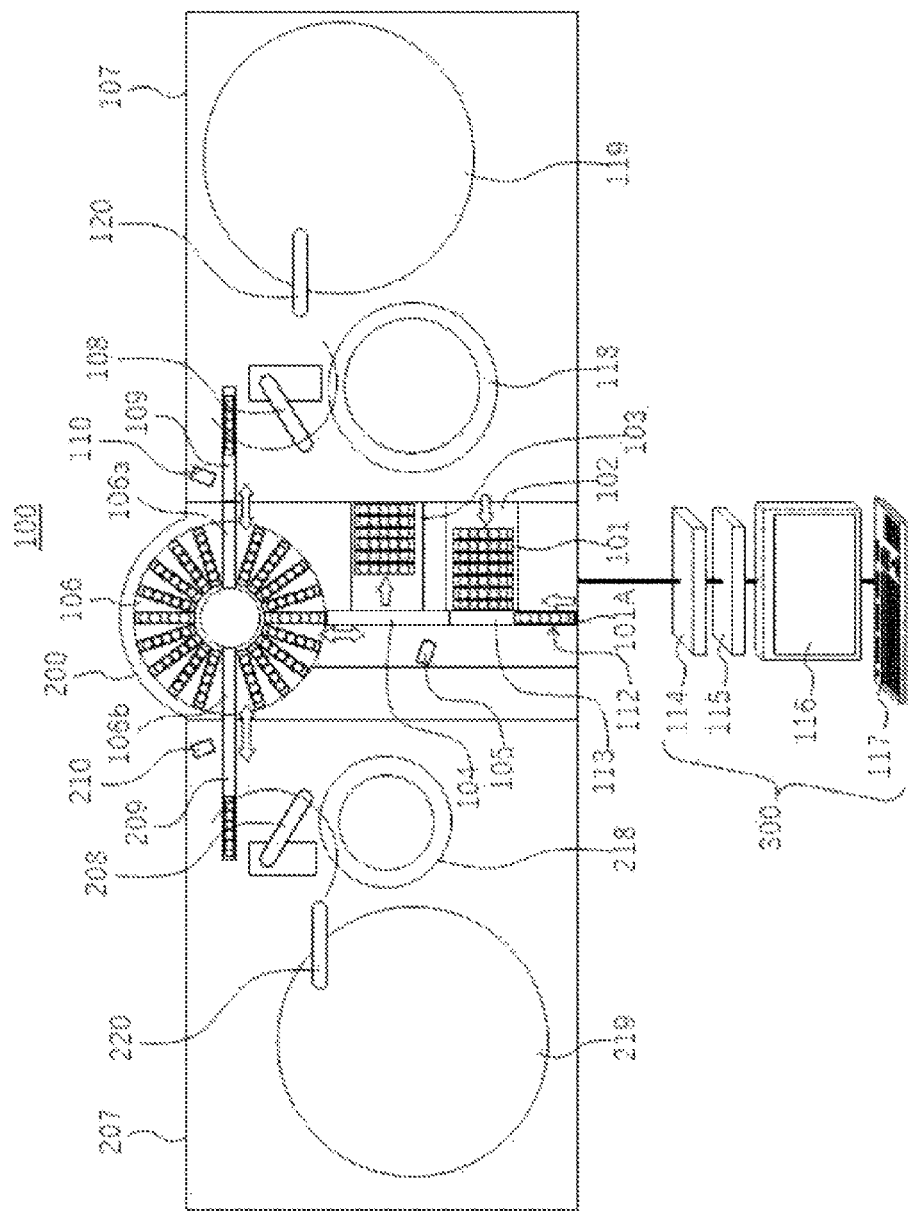

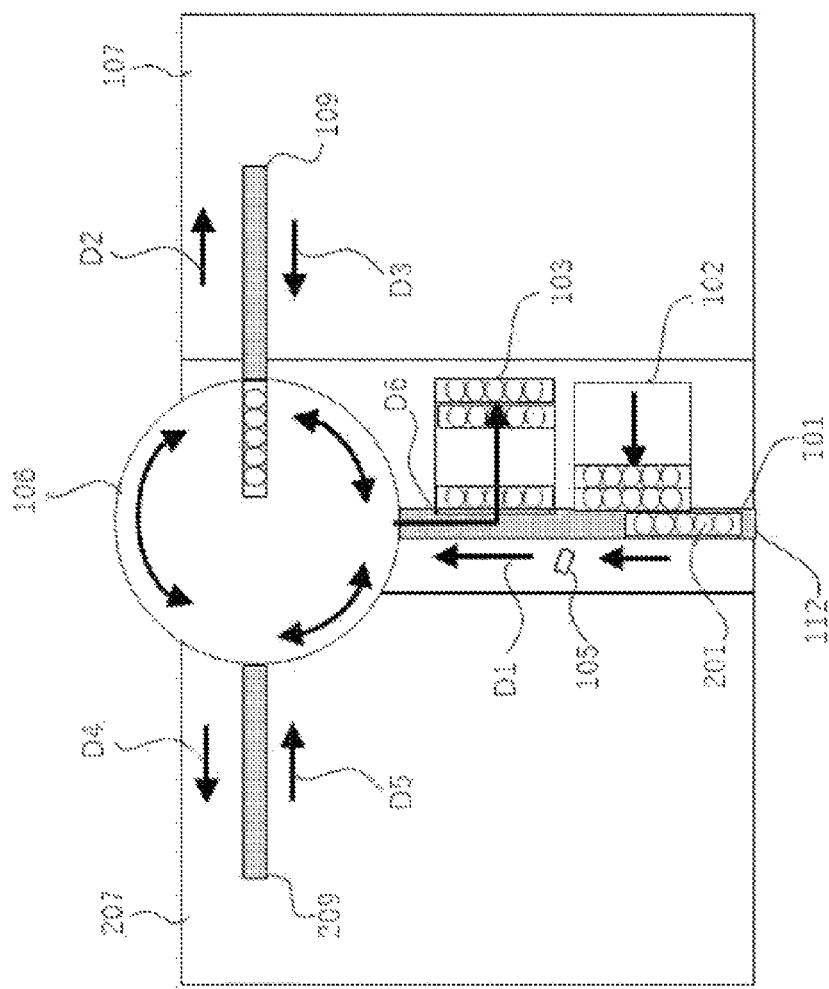
[FIG. 2]

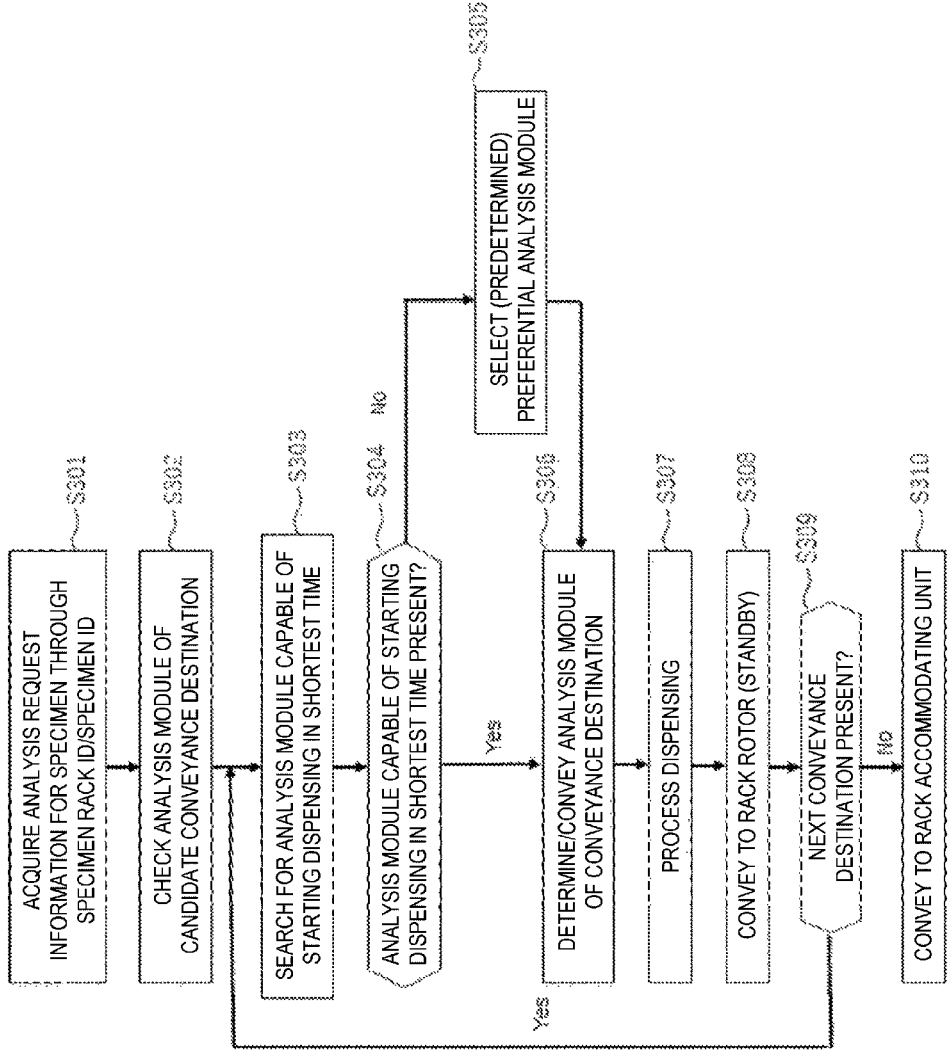
[FIG. 3]

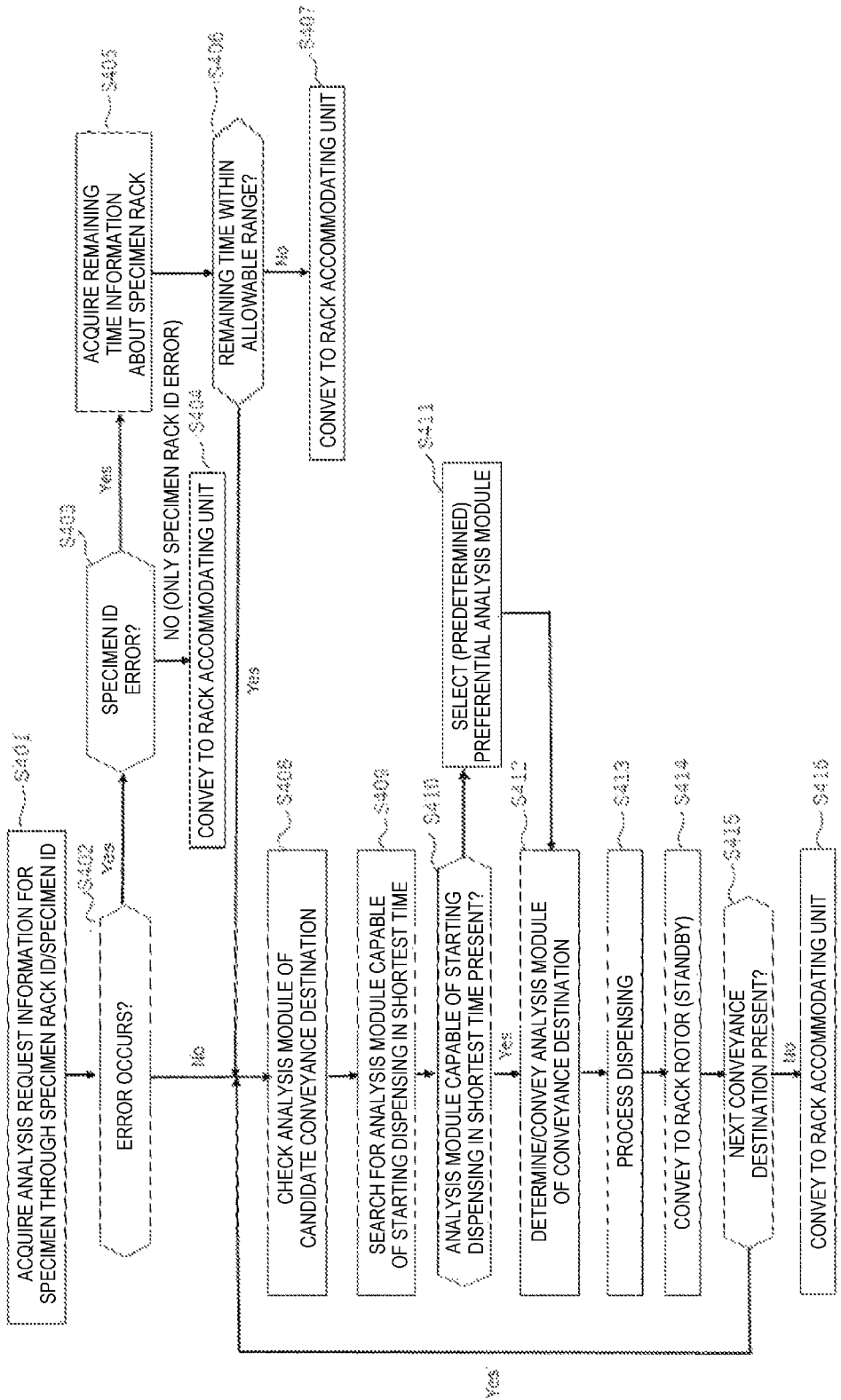
[FIG. 4]

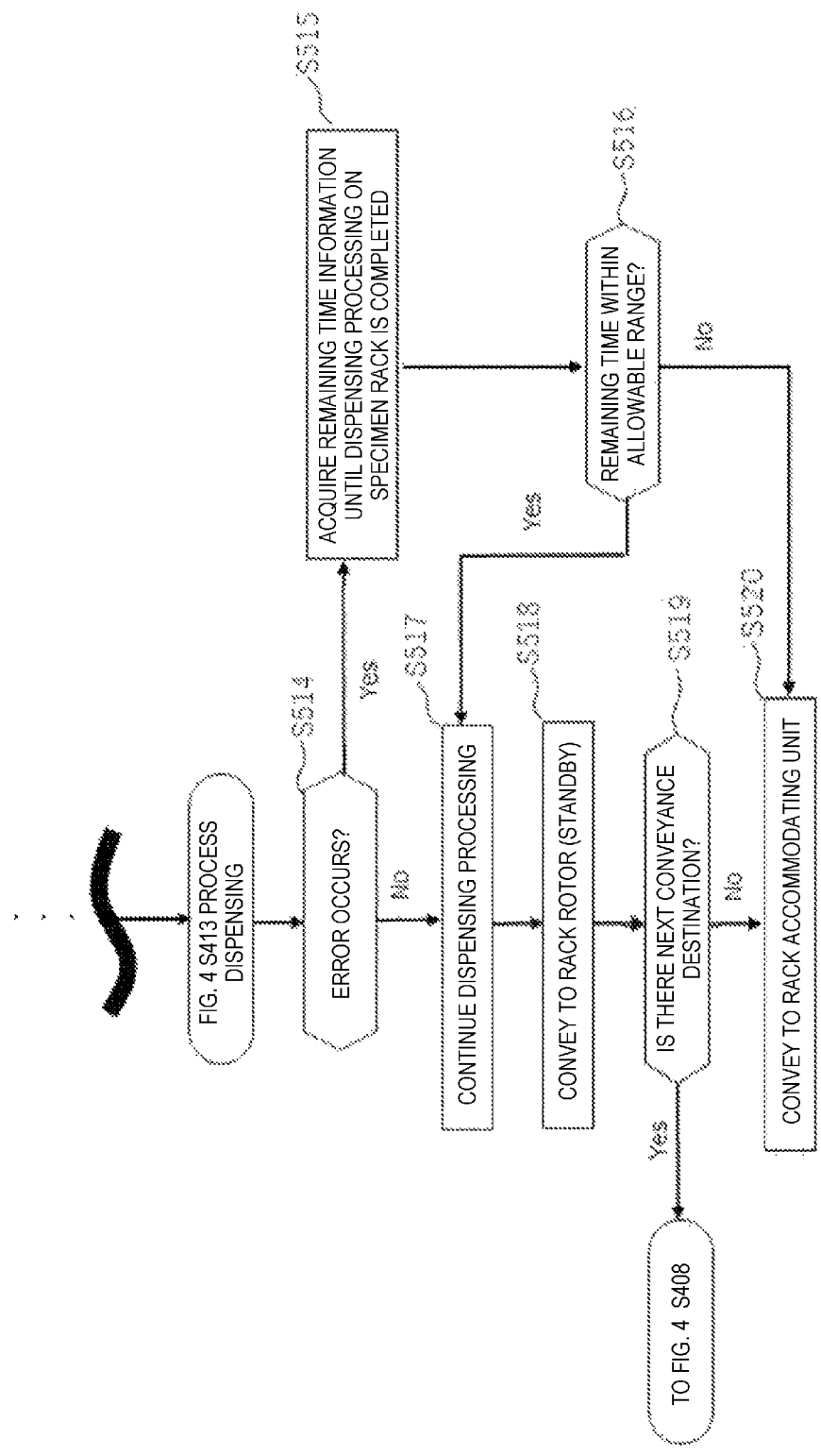
[FIG. 5]

[FIG. 6]

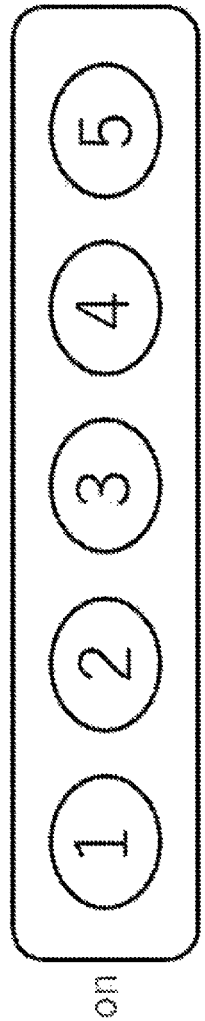

| position | 1 | 2 | 3 | 4 | 5 |
|---|---|---|---|---|---|
| NUMBER OF REQUESTED ITEMS (BIOCHEMICAL) | 5 | — | 2 | 7 | 3 |
| NUMBER OF REQUESTED ITEMS (IMMUNITY) | — | 3 | — | — | 1 |

FIRST EXAMPLE), SPECIMEN ID READING ERROR OCCURS AT POSITION 3 (@ BIOCHEMICAL)

BIOCHEMICAL
- TOTAL NUMBER OF ITEMS = 16 ITEMS (5 + 1 + 7 + 3 = 16)
- TIME REQUIRED FOR DISPENSING = 16 (ITEMS) × 8 (SECONDS) = 128 (SECONDS)
- TIME REQUIRED FOR MOVING BETWEEN ANALYSIS MODULES = 8 (SECONDS) + 8 (SECONDS) + 8 (SECONDS) = 24 (SECONDS)

IMMUNITY
- TOTAL NUMBER OF ITEMS = 4 ITEMS (3 + 1 = 4)
- TIME REQUIRED FOR DISPENSING = 4 (ITEMS) × 30 (SECONDS) = 120 (SECONDS)

• TOTAL REMAINING TIME = 128 (SECONDS) + 24 (SECONDS) + 120 (SECONDS) = 272 (SECONDS)

SECOND EXAMPLE), DISPENSING ERROR OCCURS AT POSITION 3 (@ BIOCHEMICAL)

BIOCHEMICAL
- TOTAL NUMBER OF ITEMS = 10 ITEMS (7 + 3 = 10)
- TIME REQUIRED FOR DISPENSING = 10 (ITEMS) × 8 (SECONDS) = 80 (SECONDS)
- TIME REQUIRED FOR MOVING BETWEEN ANALYSIS MODULES = 8 (SECONDS) + 24 (SECONDS) + 8 (SECONDS) = 40 (SECONDS)

IMMUNITY
- TOTAL NUMBER OF ITEMS = 4 ITEMS (3 + 1 = 4)
- TIME REQUIRED FOR DISPENSING = 4 (ITEMS) × 30 (SECONDS) = 120 (SECONDS)

• TOTAL REMAINING TIME = 80 (SECONDS) + 40 (SECONDS) + 120 (SECONDS) = 240 (SECONDS)

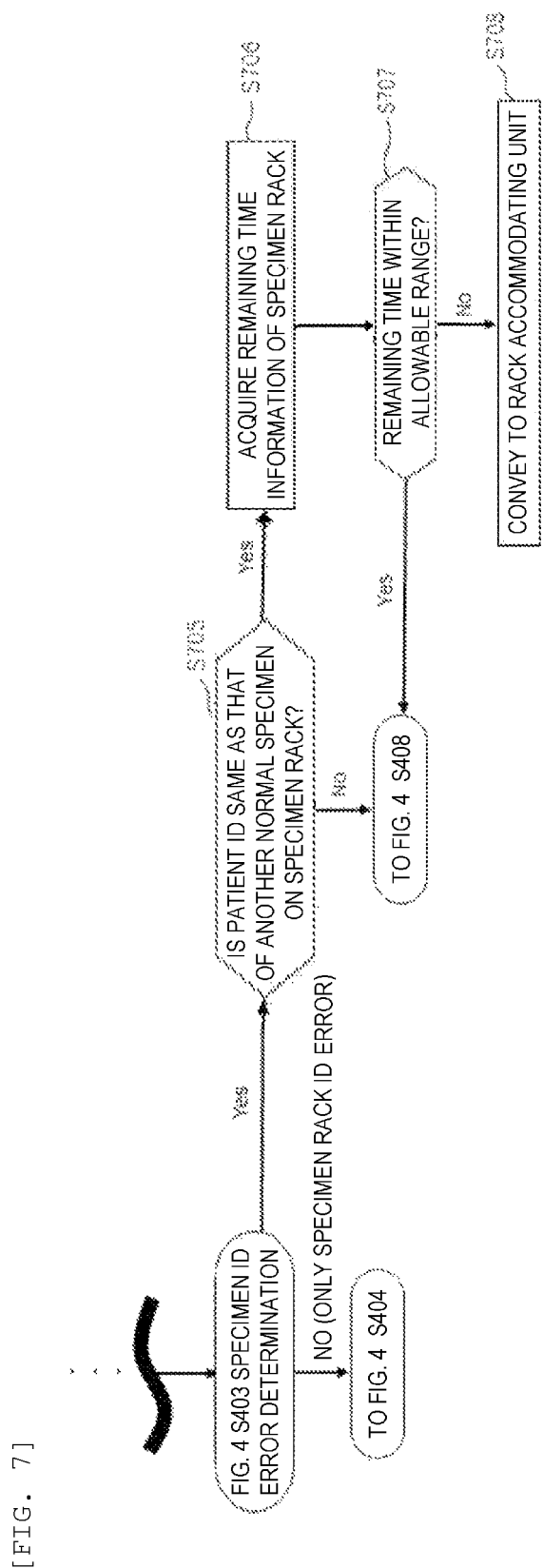
[FIG. 7]

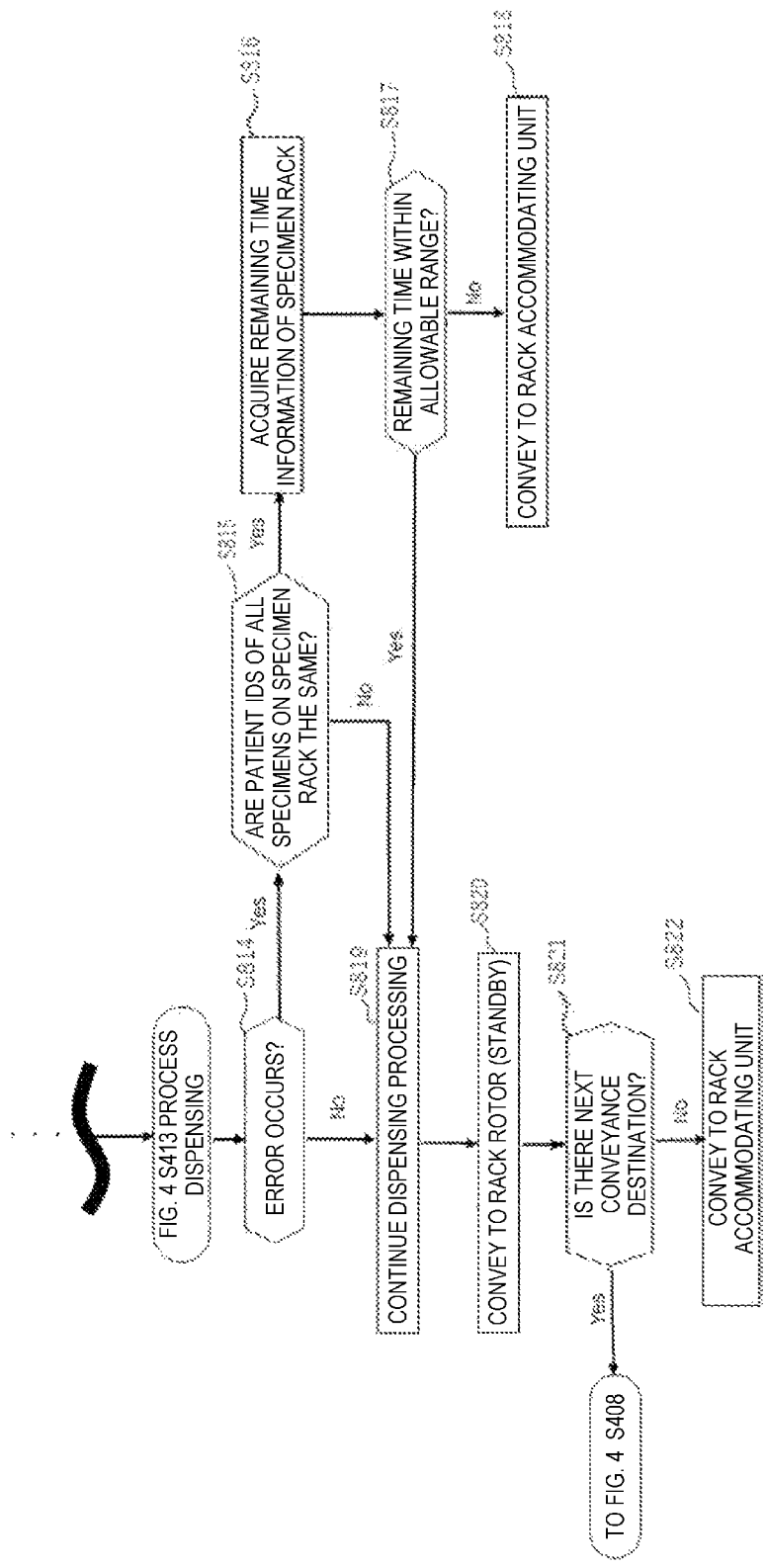
[FIG. 8]

[FIG. 9]
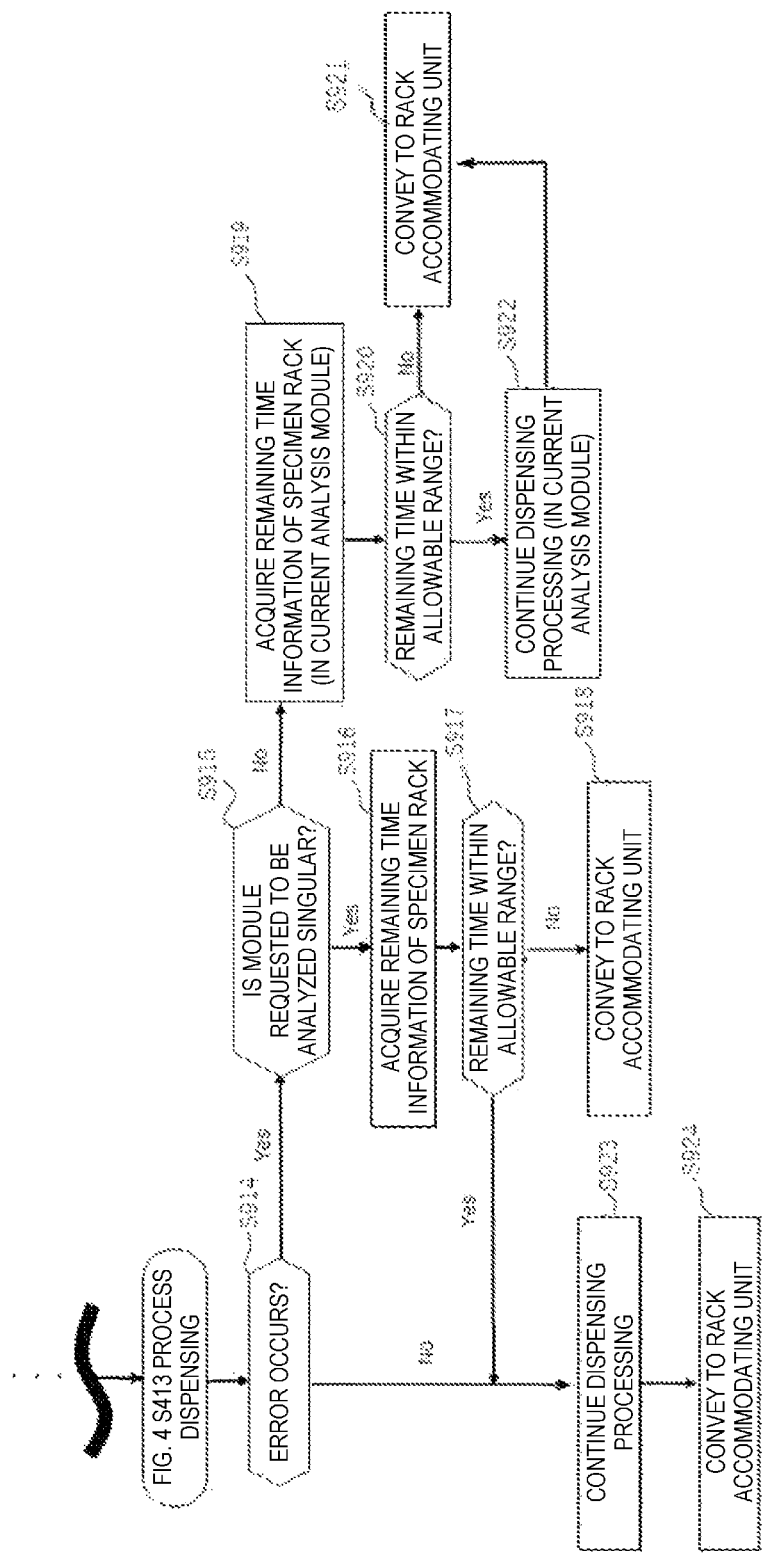

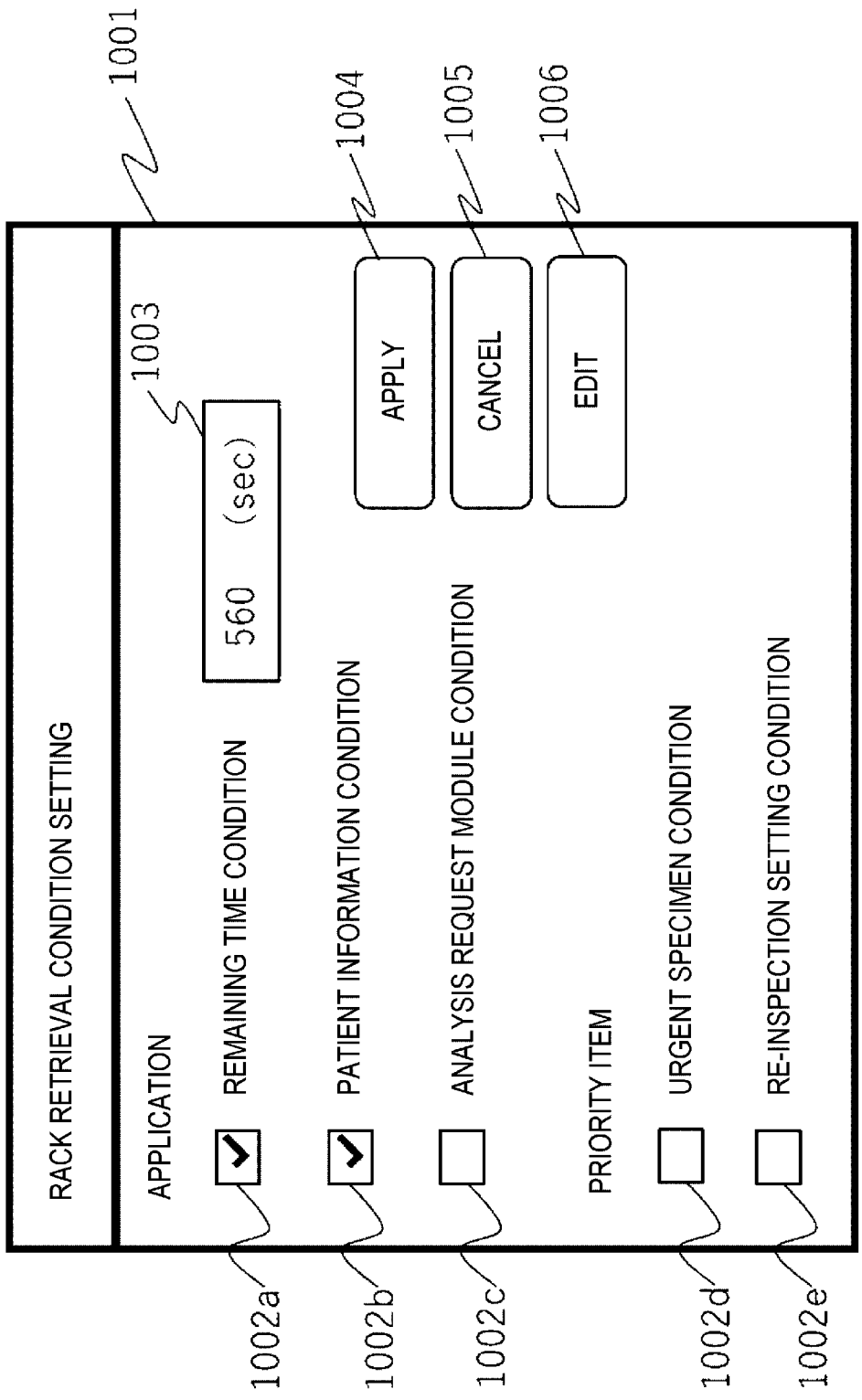
[FIG. 10]

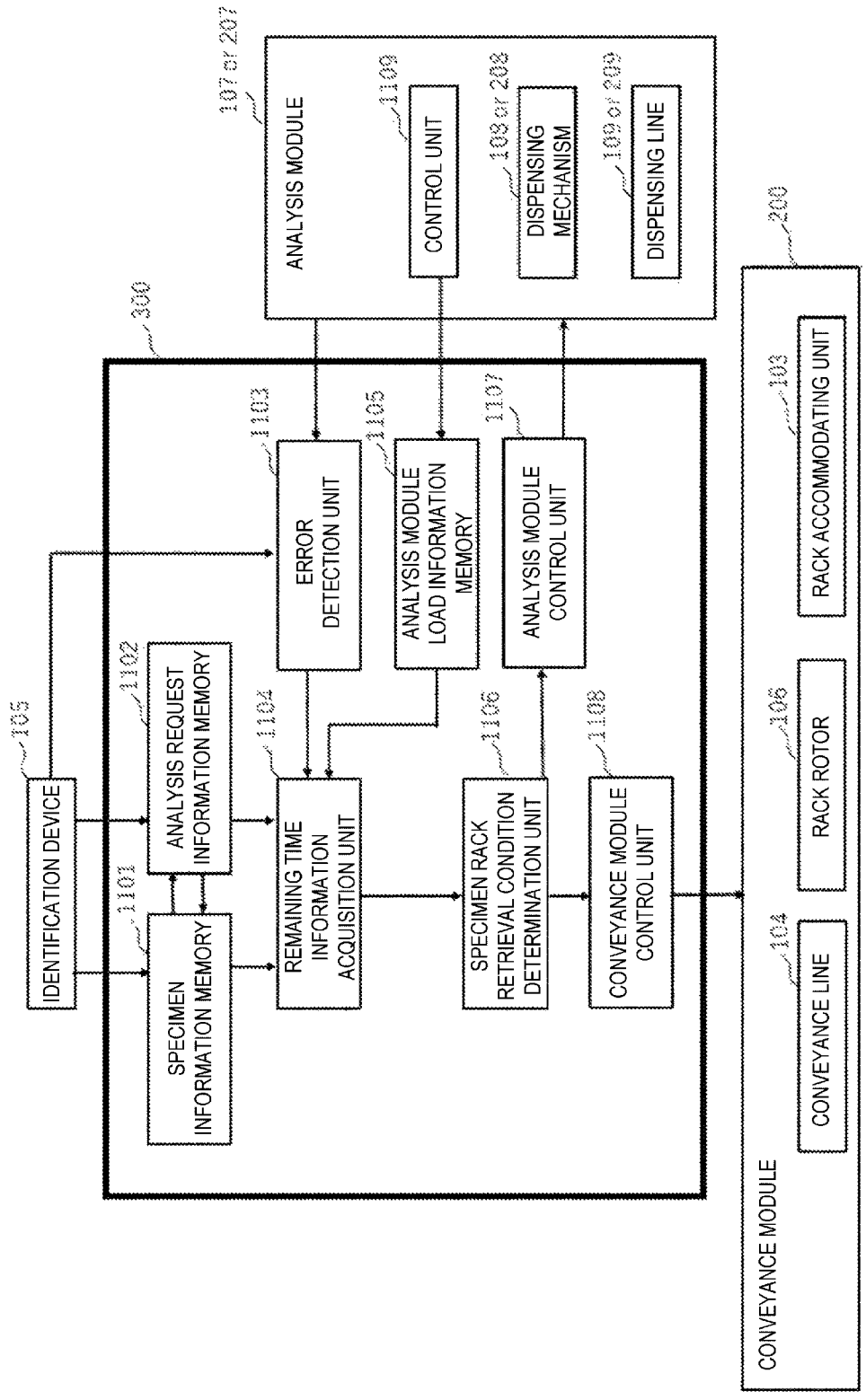
[FIG. 11]

AUTOMATIC ANALYSIS DEVICE

TECHNICAL FIELD

The present invention relates to an automatic analysis device which automatically performs qualitative and quantitative analysis on a target component contained in a biological sample such as blood or urine, and more particularly, to an automatic analysis device including a conveyance mechanism that conveys a rack on which a sample container is mounted to an analysis unit.

BACKGROUND ART

An automatic analysis device used in a clinical test automatically performs qualitative and quantitative analysis of a designated analysis item on a biological sample (hereinafter referred to as a specimen or a sample) such as blood, plasma, serum, urine, and other body fluids. As such an automatic analysis device, there is a stand-alone type in which an analysis unit that performs analysis of the specimen is operated as an independent device, for example, a module type in which a plurality of analysis units in different types of analysis fields such as biochemical and immunity are connected by a conveyance line and operated as one device, and the like.

In a configuration in which a specimen rack holding a plurality of specimen containers each accommodating a specimen is conveyed through the conveyance line as in the module type automatic analysis device, handling of the specimen may become a problem when an error occurs due to a shortage of a specimen amount, a failure in reading identification information in the specimen accommodated in the specimen container mounted in one specimen rack after analysis processing is started. For example, in a configuration in which the specimen rack is unconditionally taken out from a rack extraction port at a time point at which the error occurs due to some reason as described above even in one of the specimens mounted on the specimen rack, the processing on a specimen in which no error occurs is delayed. On the other hand, in a configuration in which when a similar error occurs, the processing on the specimen is stopped, but the processing is continued for other specimens on which normal processing is performed, the processing on the specimen in which the error occurs cannot be started until the processing on all other specimens on the specimen rack is completed and the specimen rack is retrieved from the analysis unit and then loaded into the device again. In this way, both of the configurations are in a trade-off relationship.

PTL 1 describes a technique in which, in order to specify a specimen in which an error occurs or that requires to be reloaded, and to freely interrupt analysis of a specimen rack on which the specimen is mounted and retrieve the specimen rack, when the specimen rack is mounted on a conveyance line, ID information attached to a specimen container and the specimen rack is read by an identification device, based on the read information, collation with rack retrieval request information, automatic retrieval information, and rack conveyance state information stored in advance is performed, and retrieval or conveyance of the rack is performed according to a result of the collation.

CITATION LIST

Patent Literature

PTL 1: JP-A-2016-014686

SUMMARY OF INVENTION

Technical Problem

In order to determine necessity of the retrieval of the specimen rack and a timing thereof, if an optimal condition is selected in consideration of various states related to the analysis, such as processing capability required for the device and a priority and an expiration date of a report of the analysis result for each specimen, an entire time required for the analysis may become long, and an efficiency of the analysis may be lowered. However, the technique described in PTL 1 discloses that the specimen in which the error occurs or a specimen which needs to be remeasured is retrieved by interrupting the analysis, but does not specifically disclose on what reference a retrieval condition is set.

In view of the above technical problems, the invention relates to improving an analysis efficiency by shortening an entire time required for analysis by determining a necessity and a timing of retrieval of a specimen rack under a condition suitable for various states related to the analysis when an error occurs in a specimen mounted in the specimen rack for some reason.

Solution to Problem

In order to solve the above problems, an aspect of the invention provides an automatic analysis device and a specimen conveyance method using the device. The automatic analysis device includes: a conveyance line through which a specimen rack is conveyed back and forth on which a plurality of specimen containers in which a specimen to be analyzed is accommodated are mounted; a dispensing mechanism configured to dispense the specimen from the specimen container; one or more dispensing lines on which the specimen rack is conveyed in and out from one end and conveyed back and forth to a dispensing position at which the specimen is dispensed from the specimen container by the dispensing mechanism; a rack standby unit having one or more slots in which the specimen rack is mountable, and configured to transfer the specimen rack between the one end of the conveyance line and one end of the dispensing line; an identification device configured to read information on a specimen in the specimen container mounted on the specimen rack to be conveyed to the conveyance line; a rack accommodating unit in which the specimen rack is accommodated at a position at which the specimen rack is removable; and a control unit. As a result of reading by the identification device and/or a result of dispensing by the dispensing mechanism, when an abnormality occurs in a specimen accommodated in at least one or more sample containers among the plurality of specimen containers mounted on the specimen rack, a retrieval condition applied to the specimen rack is determined based on information on the sample in which the abnormality occurs and information on a specimen accommodated in another specimen container in the specimen rack on which the specimen container accommodating the specimen is mounted, and the specimen rack is retrieved in the rack accommodating unit based on the determined retrieval condition.

Advantageous Effect

According to the aspect described above, the invention contributes to improving an analysis efficiency by shortening an entire time required for analysis by determining a necessity and a timing of retrieval of a specimen rack under a condition suitable for various states related to the analysis when an error occurs in a specimen mounted in the specimen rack for some reason.

BRIEF DESCRIPTION OF DRAWINGS

FIG. 1 is a diagram showing a basic configuration of an automatic analysis device according to the present embodiment.

FIG. 2 is a diagram showing a conveyance operation of a specimen rack in the automatic analysis device according to the present embodiment.

FIG. 3 is a flowchart showing a conveyance operation of a specimen rack when no error occurs according to the present embodiment.

FIG. 4 is a flowchart showing a conveyance operation of a specimen rack when an error (identification information reading) occurs according to the present embodiment (first embodiment).

FIG. 5 is a flowchart showing a conveyance operation of a specimen rack when an error (dispensing) occurs according to the present embodiment (first embodiment).

FIG. 6 is a diagram showing a method of acquiring remaining time information according to the present embodiment.

FIG. 7 is a flowchart showing a conveyance operation of a specimen rack when an error (identification information reading) occurs according to the present embodiment (second embodiment).

FIG. 8 is a flowchart showing a conveyance operation of a specimen rack when an error (dispensing) occurs according to the present embodiment (second embodiment).

FIG. 9 is a flowchart showing a conveyance operation of a specimen rack when an error (dispensing) occurs according to the present embodiment (third embodiment).

FIG. 10 is a diagram showing an example of a screen for setting and changing retrieval conditions of a specimen rack according to the present embodiment.

FIG. 11 is a functional block diagram for controlling retrieval determination and a conveyance operation of a specimen rack according to the present embodiment.

DESCRIPTION OF EMBODIMENTS

Hereinafter, embodiments of the invention will be described in detail with reference to drawings. In all the drawings for describing the present embodiment, those having the same function are denoted by the same reference numerals, and the repetitive description thereof will be omitted in principle.

<Overall Configuration of Device>

FIG. 1 is a diagram showing a basic configuration of an automatic analysis device according to the present embodiment.

In FIG. 1, a module type automatic analysis device 100 shown as an example in the present embodiment schematically includes a plurality of (two in the present embodiment) analysis modules (analysis units) 107 and 207, a specimen rack conveyance module 200 which conveys a specimen rack 101 on which a specimen container accommodating a specimen to be analyzed by the analysis modules 107 and 207 is mounted, and a control device 300 which controls an overall operation of the automatic analysis device 100.

In the specimen rack 101 handled by the automatic analysis device 100, a specimen container accommodating a biological sample (hereinafter, referred to as a specimen or a sample) such as blood, plasma, serum, urine, or other body fluid, which is an object of a qualitative and quantitative analysis in the automatic analysis device 100 is mounted. The sample rack 101 includes at least a specimen rack (hereinafter, simply referred to as the specimen rack 101) on which a specimen container 201 accommodating a specimen (normal specimen) to be analyzed with a normal priority is mounted, and a specimen rack (hereinafter, particularly referred to as an urgent specimen rack 101A when distinguished from the specimen rack 101) on which a specimen container 201 accommodating an urgent specimen having a higher degree of urgency of analysis measurement than the specimen rack is mounted.

The analysis modules 107 and 207 perform the qualitative and quantitative analysis by sampling (dispensing) the specimen accommodated in the specimen container 201 mounted on the specimen rack 101, and include respectively: for example, belt conveyor type dispensing lines 109 and 209 in which the specimen rack 101 conveyed by the specimen rack conveyance module 200 is conveyed from one end to a dispensing position at which the specimen is dispensed from the specimen container 201 back and forth; specimen identification devices 110 and 210 which read and identify an identification medium (not shown) such as an RFID or a bar code provided in the specimen rack 101 and the specimen container 201 in order to collate analysis request information on the specimen accommodated in the specimen rack 101 conveyed to the dispensing lines 109 and 209; specimen dispensing mechanisms 108 and 208 which dispense the specimen from the specimen container 201 of the specimen rack 101 conveyed to the dispensing positions on the dispensing lines 109 and 209 to reaction containers of reaction disks 118 and 218; reagent dispensing mechanisms 120 and 220 which dispense reagents accommodated in reagent containers of reagent disks 119 and 219 into the reaction containers of the reaction disks 118 and 218; and measurement units (not shown) which perform the qualitative and quantitative analysis by measuring a mixed solution (reaction solution) of the specimen and the reagent dispensed into the reaction container.

The dispensing lines 109 and 209 use a reciprocating conveyance mechanism which pulls the specimen rack 101 from the specimen rack conveyance module 200 to the analysis modules 107 and 207 and delivers the specimen rack 101 from the analysis modules 107 and 207 to the specimen rack conveyance module 200. The present embodiment describes a case where the belt conveyor type conveyance mechanism is used as the dispensing lines 109 and 209, and a configuration may be used in which a protrusion structure driven along the dispensing lines 109 and 209 is fitted into a recess provided in advance in the specimen rack 101 and conveyed.

The analysis modules mounted on the automatic analysis device 100 do not have to be of the same type, and a biochemical analysis module, an immune analysis module, a blood coagulation analysis module, and the like can be appropriately disposed according to the usage environment.

The specimen rack conveyance module 200 conveys the specimen rack 101 loaded into the automatic analysis device 100 between the analysis modules 107 and 207, and includes: for example, a belt conveyor type conveyance line 104 through which the specimen rack 101 is conveyed back and forth; an urgent specimen rack loading unit 112 which is provided adjacent to the conveyance line 104 and loads the urgent specimen rack 101A; a specimen rack supply unit 102 which is provided more adjacent to the conveyance line 104 on one end side of the conveyance line 104 than the urgent specimen rack loading unit 112 and supplies the specimen rack 101 of the normal specimen; a specimen rack accommodating unit 103 which is provided more adjacent to the conveyance line 104 on one end side of the conveyance line 104 than the specimen rack supply unit 102 and in which the specimen rack 101 is accommodated; an urgent specimen rack standby area 113 which is provided on the conveyance line 104 on the other end side of the conveyance line 104 than the specimen rack accommodating unit 103 and causes the urgent specimen rack 101A to be on standby temporarily; a rack rotor (rack standby unit) 106 which is disposed on one end of the conveyance line 104, includes one or more slots 106a and 106b on which the specimen rack 101 can be mounted, and transfers the specimen rack 101 between the one end of the conveyance line 104 and one end of each of the one or more dispensing lines; and a specimen identification device 105 which reads and identifies the identification medium (not shown) such as the RFID or the bar code provided in the specimen rack 101 and the specimen container 201 in order to inquire the analysis request information related to the specimen accommodated in the specimen container 201 mounted on the specimen rack 101 conveyed through the conveyance line 104. Here, an example of the rotor type rack rotor is shown as the rack standby unit 106, but other configurations such as arranging a plurality of specimen racks 101 in a row on standby and distributing the specimen racks 101 to each analysis module can also be applied.

The control device 300 controls the overall operation of the automatic analysis device 100, and includes: a display unit 116 which displays an input screen for various parameters and settings, analytical inspection data for initial inspection or re-inspection, a measurement result, and the like; an input unit 117 which inputs the various parameters and settings, the analysis request information, an instruction for starting analysis, and the like; a storage unit 115 which stores the various parameters and settings, the measurement result, the analysis request information of the specimen accommodated in the specimen container 201 mounted on each specimen rack; and a control unit 114 which controls the overall operation of the automatic analysis device 100. Although not shown here, the analysis module 107 and 207 may include a control device which generates, processes, and stores various data such as the measurement result and load information of the device, and may transmit and receive the information to and from the control device 300 described above.

FIG. 2 is a diagram showing a conveyance operation of a specimen rack in the automatic analysis device according to the present embodiment.

In the automatic analysis device shown in the figure, when the specimen rack 101 is loaded into the specimen rack supply unit 102 or the urgent specimen rack loading unit 112, the specimen rack 101 is conveyed in a direction D1 and supplied to the rack rotor (rack standby unit) 106. An ID set in the loaded specimen rack 101 (hereinafter, referred to as a specimen rack ID) and an ID set in the specimen container 201 (hereinafter, referred to as a specimen ID) provided in the specimen rack 101 are read by the specimen identification device 105, and a conveyance destination of the specimen rack 101 is determined by the control unit 114 in FIG. 1 based on the read information. Thereafter, the specimen rack 101 is held on the rack rotor (rack standby unit) 106, and is conveyed in a direction D2 by the dispensing line 109, which is a rack conveyance mechanism corresponding to the analysis module 107, as soon as preparation for measurement of an analysis module, between the analysis modules 107 and 207, which is determined as the conveyance destination first (here, the analysis module 107) is completed. The specimen rack 101 subjected to the processing in the analysis module 107 is conveyed in a direction D3 by the dispensing line 109 and held by the rack rotor (rack standby unit) 106, and then when the conveyance to the analysis module 207 is determined, as soon as preparation for measurement is completed, the specimen rack 101 is conveyed in a direction D4 by the dispensing line 209 which is a rack conveyance mechanism corresponding to the analysis module 207. The specimen rack 101 subjected to the processing in the analysis module 207 is conveyed in a direction D5 by the dispensing line 209 and held by the rack rotor (rack standby unit) 106. Then, after confirming that all necessary processing is performed on the specimen accommodated in the specimen container 201 mounted on the specimen rack 101, the specimen rack 101 is conveyed in a direction D6 and accommodated in the specimen rack accommodating unit 103.

FIG. 3 is a flowchart showing a conveyance operation of a specimen rack when no error occurs according to the present embodiment.

When the specimen rack 101 is loaded into the conveyance line 104, the specimen identification device 105 on the conveyance line 104 reads the specimen rack ID attached to the specimen rack 101 and the specimen ID attached to the specimen container 201 mounted on the specimen rack 101, and acquires information on the specimen rack and the analysis request information on the specimen in each specimen container (step S301).

Based on the acquired information, an analysis module which is a candidate conveyance destination is checked (step S302), and the analysis module capable of starting dispensing in the shortest time is searched for (step S303). Here, when there is the analysis module capable of starting dispensing in the shortest time (step S304), the analysis module is determined as the conveyance destination, and the conveyance is performed (step S306). On the other hand, when there is no analysis module capable of starting dispensing in the shortest time (step S304), a predetermined preferential analysis module is determined as the conveyance destination, and the conveyance is performed (step S305). Here, for example, when the analysis module which is the candidate conveyance destination is the biochemical analysis module or the immune analysis module, the preferential analysis module may be set to convey the specimen rack 101 prior to the immune analysis module which is easily affected by carryover, but the invention is not limited thereto.

Dispensing processing is performed on the specimen rack 101 conveyed to the analysis module of the conveyance destination in step S306 (step S307), and then conveyed to the rack rotor (rack standby unit) 106 to be on standby (step S308). Here, when there is another analysis module which is a next conveyance destination (step S309), the process returns to step S303; and when there is no another analysis module, the specimen rack 101 is conveyed to the specimen rack accommodating unit 103 (step S310).

First Embodiment

FIG. 4 is a flowchart showing a conveyance operation of a specimen rack when an error (identification information reading) occurs according to the present embodiment. The present flowchart describes a case where the specimen rack ID or the specimen ID cannot be read as an error occurrence point, or a case where an error occurs based on a read result.

An example of the latter case is a case where the read specimen ID overlaps with information already analyzed in the past.

Here, it is assumed that the error occurs in one or more specimen containers 201 among the specimen containers 201 mounted on the specimen rack 101.

When the specimen rack 101 is loaded into the conveyance line 104, the specimen identification device 105 on the conveyance line 104 reads the specimen rack ID attached to the specimen rack 101 and the specimen ID attached to the specimen container 201 mounted on the specimen rack 101, and acquires information on the specimen rack and analysis request information on the specimen (step S401). Here, when the specimen rack ID or the specimen ID cannot be read, or when a read result of a specimen cannot be analyzed, the error occurs. When the error occurs (step S402) and a reason of the error relates to the reading of the specimen rack ID (step S403), since the analysis cannot be continued in a state where the information on the specimen rack 101 is unknown, the specimen rack 101 is conveyed to the specimen rack accommodating unit 103 at the time point (step S404). On the other hand, when the reason of the error relates to the reading of the specimen ID (step S403), the control device 300 described in FIG. 1 acquires information on a remaining time required until processing on all the other specimens in the specimen rack 101 on which the specimen container 201 in which the error occurs is mounted is completed (step S405). Then, it is determined whether the acquired remaining time is within a preset allowable time range (step S406), and when the acquired remaining time is not within the allowable time range, the specimen rack 101 is conveyed to the specimen rack accommodating unit 103 at the time point and accommodated (retrieved) (step S407). On the other hand, when there is no error occurs in step S402, and when the remaining time is within the allowable time range as described above, an analysis module which is the candidate conveyance destination is checked (step S408). Since steps S409 to S416 are the same as steps S303 to S310 described above in FIG. 3, the description thereof will be omitted.

FIG. 5 is a flowchart showing a conveyance operation of a specimen rack when an error (dispensing) occurs according to the present embodiment. The present flowchart describes a case where there is a defect or the like due to a dispensing operation as the error occurrence point. Since the flow up to the dispensing processing is the same as that of steps S401 to S413 described above in FIG. 4, the description thereof will be omitted. When the error occurs in the dispensing processing (step S514), the control device 300 described in FIG. 1 acquires the information on a remaining time required until the processing on all the other specimens in the specimen rack 101 on which the specimen container 201 in which the error occurs is mounted is completed (step S515). Then, it is determined whether the acquired remaining time is within a preset allowable time range (step S516), and when the acquired remaining time is not within the allowable time range, the specimen rack 101 is conveyed to the specimen rack accommodating unit 103 at the time point and accommodated (retrieved) (step S520). On the other hand, when there is no error occurs in step S514, and when the remaining time is within the allowable time range as described above, the dispensing processing on the specimen rack 101 is continued (step S517).

When the dispensing processing is completed, the specimen rack 101 is conveyed to the rack rotor (rack standby unit) 106 to be on standby (step S518). Here, when there is another analysis module which is a next conveyance destination (step S519), the process returns to step S408 in FIG. 4, and when there is no other analysis module, the specimen rack 101 is conveyed to the specimen rack accommodating unit 103 (step S520).

In the present embodiment, even when the error occurs as described above, the information on the remaining time at the time point required until the processing on all the other specimens is completed in the specimen rack 101 on which the specimen container 201 in which the error occurs is mounted is acquired, it is determined whether the time is within the preset allowable time range, and based on the determination result, it is determined whether the specimen rack 101 is accommodated (retrieved) at this time point, or whether the conveyance or the dispensing processing is continued. According to the present configuration, even in various states, the processing on the specimen rack 101 including the specimen container 201 in which the error occurs can be optimized and performed according to the set remaining time so as to improve an overall efficiency.

Here, the conveyance operation of the specimen rack when the error (dispensing) shown in FIG. 5 occurs can be applied independently, in addition to being applied in combination with the conveyance operation of the specimen rack when the error (identification information reading) shown in FIG. 4 as described above occurs. In this case, instead of steps S401 to S408 of FIG. 4, steps S301 and S302 of FIG. 3 are applied to the flowchart of FIG. 5.

Here, FIG. 6 is a diagram showing a method of acquiring the remaining time information according to the present embodiment. The present figure describes a first example where five specimen containers 201 are mounted in the specimen rack 101, and for example, in a biochemical analysis device which is one of the analysis modules, there is a request of five items for a specimen at a position 1, one item for a specimen at a position 2, two items for a specimen at a position 3, seven items for a specimen at a position 4, and three items for a specimen at a position 5, a specimen ID of the specimen at the position 3 cannot be read and the error occurs.

In the above case, the total number of items requested for the specimens at the positions 1 to 2 and 4 to 5 is 16 items (5+1+7+3=16). Here, for example, when a cycle time required for a single dispensing operation of the biochemical analysis device is 8 seconds, the remaining time is 16 (items)×8 (seconds)=128 seconds.

Here, in an actual analysis, there is a case where an analysis in the plurality of analysis modules is requested for the specimen mounted on one specimen rack 101. In this case, as the remaining time information, for example, a moving time in a case of moving from one analysis module 107 to the other analysis module 207 via the rack rotor (rack standby unit) 106 is obtained and added, and a time required for dispensing at a moving destination is also taken into consideration.

That is, when the specimen rack 101 moves at the shortest distance, when a time required for conveyance from a dispensing position in the biochemical analysis device to the rack rotor (rack standby unit) 106 is 8 seconds, a time required for the rack rotor (rack standby unit) 106 to rotate is 8 seconds, and a time required for conveyance from the rack rotor (rack standby unit) 106 to an immune analysis device which is the other analysis module is 8 seconds, a total moving time is 24 seconds.

Then, for example, in the immune analysis device which is the other analysis module, when there is a request of three items for a specimen at a position 2 and one item for a specimen at a position 5, and a cycle time required for a single dispensing operation is 30 seconds, the remaining time required for the dispensing processing is 4 (items)×30 (seconds)=120 seconds. That is, a total remaining time is 128 seconds+24 seconds+120 seconds=272 seconds.

Next, as a second example, a case will be examined in which a condition of the numbers of requested items are the same as those of the first example described above, the reading of the specimen ID is normally performed for all the specimen containers 201 in the specimen rack and the error does not occur, but the error occurs in the dispensing of the specimen at the position 3 in a state where the dispensing of the specimens at the positions 1 and 2 is completed. In this case, a total number of items requested for the specimens at the undispensed positions 4 and 5 is 10 (7+3). Here, in the same manner as described above, when the cycle time required for the single dispensing operation by the device is 8 seconds, a remaining time required for the dispensing processing is 10 (items)×8 (seconds)=80 seconds. Here, for the moving time when moving from one analysis module 107 to the other analysis module 207 via the rack rotor (rack standby unit) 106, when the rotation (standby) time in the rack rotor (rack standby unit) 106 is 24 seconds and the time required for dispensing at the moving destination is the same as in the first example described above, a total remaining time is 80 seconds+40 seconds+120 seconds=240 seconds.

Here, the allowable range of the remaining time varies as being set depending on a processing capacity required for the analysis module and the time required for each cycle, but in a case of 560 seconds as an example, in both of the above examples, the total remaining time is within the allowable range.

Second Embodiment

There are cases where specimen owners (subjects, hereinafter referred to as patients) of the specimens accommodated in all the specimen containers 201 mounted on the specimen rack 101 are the same, and where specimens from a plurality of different patients are mixed. At a time of analysis, information of each patient is included in the specimen ID described above as a corresponding patient ID. Here, in a case where a specimen in which an error occurs and all other normal specimens are based on different patient IDs, it may be desirable to report an analysis result of the normal specimens derived from other patients at an early stage. Therefore, the present embodiment descries retrieval determination of the specimen rack 101 in consideration of the patient information of the specimen mounted on the same specimen rack in the above-described aspect.

FIG. 7 is a flowchart showing a conveyance operation of a specimen rack when an error (identification information reading) taking the patient information into consideration occurs according to the present embodiment. Since the flow up to the determination of whether there is a specimen ID error is the same as that of steps S401 to S403 described above in FIG. 4, the description thereof will be omitted. Here, when the reason of the error relates to the reading of the specimen rack ID (step S403), since the analysis cannot be continued in a state where the information on the specimen rack 101 is unknown, the specimen rack 101 is conveyed to the specimen rack accommodating unit 103 at the time point (step S404). On the other hand, when the reason of the error relates to the reading of the specimen ID (step S403), the control device 300 described in FIG. 1 reads the patient information stored in a specimen information memory 1101 to be described later in FIG. 11, and determines whether a patient ID of the specimen in which the error occurs is the same as a patient ID of another normal specimen on the specimen rack 101 on which the specimen container 201 accommodating the specimen is mounted (step S705). Here, when the patient IDs are different, the process returns to step S408 in FIG. 4 in order to report the analysis result of the other normal specimen at an early stage.

On the other hand, when the patient IDs are the same in step S705, since the analysis result of the specimen in which the error occurs cannot be obtained in any case, a report cannot be made on a patient-by-patient basis, the process proceeds to step S707, and the remaining time information described above is obtained (step S706). Then, it is determined whether the acquired remaining time is within a preset allowable time range (step S707), and when the acquired remaining time is not within the allowable time range, the specimen rack 101 is conveyed to the specimen rack accommodating unit 103 at the time point and accommodated (retrieved) (step S708). On the other hand, when the remaining time is within the allowable time range, the process returns to step S408 of FIG. 4.

FIG. 8 is a flowchart showing a conveyance operation of a specimen rack when an error (dispensing) taking the patient information into consideration occurs according to the present embodiment. Since the flow up to the dispensing processing is the same as that of steps S401 to S413 described above in FIG. 4, the description thereof will be omitted. When the error occurs in the dispensing processing (step S814), the control device 300 described in FIG. 1 reads the patient information stored in the specimen information memory 1101 to be described later in FIG. 11, and determines whether a patient ID of the specimen in which the error occurs is the same as a patient ID of another normal specimen on the specimen rack 101 on which the specimen container 201 accommodating the specimen is mounted (step S815). Here, when the patient IDs are different, the dispensing processing is continued in order to report the analysis result of the other normal specimen at an early stage (step S819).

On the other hand, when the patient IDs are the same in step S815, the process proceeds to step S816, and the remaining time information described above is obtained (step S816). Then, it is determined whether the acquired remaining time is within a preset allowable time range (step S817), and when the acquired remaining time is not within the allowable time range, the specimen rack 101 is conveyed to the specimen rack accommodating unit 103 at the time point and accommodated (retrieved) (step S818). On the other hand, when the remaining time is within the allowable time range, the dispensing processing is continued (step S819). Since steps S820 to S822 are the same as steps S414 to S416 described above in FIG. 4, the description thereof will be omitted.

Third Embodiment

As described in FIG. 6, in the embodiments described above, when the analysis in the plurality of analysis modules is requested for a specimen mounted on one specimen rack 101, the remaining time information is obtained in consideration of the time required for dispensing in all the analysis modules and the moving time between the analysis modules. However, in practice, even in the case where the analysis in the plurality of analysis modules is requested, when the analysis in one of the analysis modules is completed, it may be desirable to retrieve the analysis module once to cope with the error. Therefore, the present embodiment describes a configuration in which when there is an error caused by dispensing in the above-described aspect, even when the analysis in the plurality of analysis modules is requested, retrieval determination of the specimen rack 101 is performed based on the remaining time information obtained for the analysis module in which the dispensing is being performed.

FIG. 9 is a flowchart showing a conveyance operation of a specimen rack when an error (dispensing) taking an analysis request module into consideration occurs according to the present embodiment. Since the flow up to the dispensing processing is the same as that of steps S401 to S413 described above in FIG. 4, the description thereof will be omitted. When the error occurs in the dispensing processing (step S814), the control device 300 described in FIG. 1 reads analysis request information stored in an analysis request information memory 1102 and an analysis module load information memory 1105 to be described later in FIG. 11, and a latest analysis state of the analysis module, and determines whether there is one analysis module requested to be analyzed for the other normal specimens on the specimen rack 101 on which the specimen container 201 accommodating the specimen in which the error occurs is mounted (step S915).

Here, when the number of analysis request modules is not one (plural), the remaining time information required until the dispensing processing for all the specimens in the specimen rack 101 in the analysis module in which the dispensing processing is currently performed is completed is acquired (step S919), and it is determined whether the time is within a preset allowable time range (step S920). As a result of the determination, when the remaining time is not within the allowable time range, the specimen rack 101 is conveyed to the specimen rack accommodating unit 103 at the time point and accommodated (retrieved) (step S921). On the other hand, when the remaining time is within the allowable time range, the dispensing processing of the specimen rack 101 in a current analysis module is continued (step S922), and then the specimen rack 101 is accommodated (retrieved) to the rack accommodating unit (step S921).

On the other hand, when the number of analysis request modules is one in step S915, the information on a remaining time required until the dispensing processing on all the specimens in the specimen rack 101 is completed is acquired (step S916), and it is determined whether the time is within a preset allowable time range (step S917). As a result of the determination, when the remaining time is not within the allowable time range, the specimen rack 101 is conveyed to the specimen rack accommodating unit 103 at the time point and accommodated (retrieved) (step S918). On the other hand, when the remaining time is within the allowable time range in step S917, the dispensing processing is continued (step S923), and then the specimen rack 101 is accommodated (retrieved) to the rack accommodating unit (step S924).

According to the configuration described above, even when there are the plurality of analysis request modules, the specimen rack can be retrieved without moving to another analysis module during or after the processing according to the remaining time required for the processing in the analysis module on which the dispensing processing is currently being performed. In this case, the allowable range of the remaining time can be set in consideration of the time required for one cycle of the analysis module.

FIG. 10 is an example of a screen for setting and changing rack retrieval conditions according to the above-described embodiments. A retrieval condition setting screen 1001 is displayed on the display unit 116 shown in FIG. 1, and includes selection buttons 1002*a* to 1002*c* for an operator to select whether the retrieval conditions are applied via the input unit 117, selection buttons 1002*d* to 1002*e* for selecting an item that should be prioritized over the application of the retrieval conditions, and a condition input field 1003 in which the remaining time information can be input as a specific value. Here, as an example, a case where the allowable range of the remaining time is set to 560 seconds is shown, but this value can be set in consideration of the processing capacity of the analysis module, an operation time required for one cycle, and the like.

Here, an urgent specimen condition in the item that should be prioritized refers to, for example, a condition that can be set, when an urgent specimen is included in other normal specimens in the specimen rack 101 in which the specimen in which the error occurs is mounted, so as to continue the analysis in order to complete the analysis of the urgent specimen with priority at an early stage regardless of the remaining time condition. Here, information indicating that the specimen is the urgent specimen can be acquired from the specimen information memory 1101 to be described later in FIG. 11.

Further, a re-inspection setting condition in the item that should be prioritized refers to, for example, a condition that can be set, when it is set that re-inspection is necessary for the specimen in the specimen rack 101 on which the specimen in which the error occurs is mounted, so as to convey the specimen rack 101 to the rack rotor (rack standby unit) 106 to be on standby instead of the rack retrieval in order to preferentially perform analysis related to the re-inspection regardless of the remaining time condition.

When the selection button 1002*b* of the patient information condition and the selection button 1002*c* of the analysis request module condition are checked, it is necessary to obtain the remaining time information, and therefore, the selection button 1002*a* of the remaining time condition is automatically checked. In addition, the operator can reflect these condition settings as the settings of the device by operating an application button 1004 for applying these condition settings to the device, a cancel button 1005 for canceling the settings, and an edit button 1006 for changing the set conditions.

FIG. 11 is a functional block diagram for controlling the retrieval determination and the conveyance operation of the specimen rack according to the present embodiment described above, and is a diagram functionally showing a configuration relating to the present control in particular in the control device 300.

The control device 300 mainly includes the specimen information memory 1101, the analysis request information memory 1102, an error detection unit 1103, a remaining time information acquisition unit 1104, an analysis module load information memory 1105, a specimen rack retrieval condition determination unit 1106, an analysis module control unit 1107, and a conveyance module control unit 1108. The specimen information memory 1101 stores specimen information (for example, the patient information such as the patient ID, urgent specimen information, specimen rack information, and the like) based on information read from the identification device 105. The analysis request information memory 1102 stores the analysis request information (information on the analysis items requested to each specimen, and the like) based on the information read from the identification device 105. The specimen information and the analysis request information stored in these memories are associated with each other. The analysis module load information memory 1105 acquires and stores latest analysis state and load state on the analysis modules 107 and 207 from the control unit 1109, and when there is the analysis module in which the processing on the specimen rack is completed, updates and reflects the information.

The error detection unit 1103 detects the error based on a reading result by the identification device 105 and the information obtained from the analysis modules 107 and 207. With the detection of the error as a trigger, the remaining time information acquisition unit 1104 obtains the remaining time information required for processing on the other specimens in the specimen rack on which the specimen in which the error occurs is mounted, based on the information stored in the specimen information memory 1101, the analysis request information memory 1102, and the analysis module load information memory 1105.

The specimen rack retrieval condition determination unit 1106 determines whether the obtained remaining time information is within a preset allowable time range, and determines a condition for retrieving the specimen rack based on a result of this determination. That is, it is determined whether to retrieve the specimen rack at this time point, or to continue the operation of conveyance or dispensing.

The specimen rack retrieval condition determination unit 1106 sends an instruction to the analysis module control unit 1107 and the conveyance module control unit 1108 according to the above-described determination result. According to this instruction, the analysis module control unit 1107 controls operations of various mechanisms including the specimen dispensing mechanisms 108 and 208, the dispensing lines 109 and 209, and the like of the analysis modules 107 and 207, and the conveyance module control unit 1108 controls operations of various mechanisms including the specimen rack accommodating unit 103, the conveyance line 104, the rack rotor 106, and the like of the conveyance module 200.

The invention is not limited to the embodiments described above, and includes various modifications. For example, the above-described embodiments have been described in detail for easy understanding of the invention, and it is not necessarily limited to one having all the configurations described above. A part of the configuration of one embodiment can be replaced with the configuration of another embodiment, and the configuration of another embodiment can be added to the configuration of one embodiment. Further, other configurations may be added to, deleted from, or replaced with a part of a configuration of each embodiment.

REFERENCE SIGN LIST 100 automatic analysis device
101 specimen rack
101A urgent specimen rack
102 specimen rack supply unit
103 specimen rack accommodating unit
104 conveyance line
105 specimen identification device
106 rack rotor (rack standby unit)
106a, 106b slot
201 specimen container
107, 207 analysis module (analysis unit)
108, 208 specimen dispensing mechanism
109, 209 dispensing line
110, 210 specimen identification device
112 urgent specimen rack loading unit
113 urgent specimen rack standby area
114 control unit
115 storage unit
116 display unit
117 input unit
118, 218 reaction disk
119, 219 reagent disk
120, 220 reagent dispensing mechanism
200 specimen rack conveyance module
300 control device
1001 retrieval condition setting screen
1002a remaining time condition selection button
1002b patient information condition selection button
1002c analysis request module condition selection button
1002d urgent specimen condition selection button
1002e re-inspection setting condition selection button
1003 condition input field
1004 application button
1005 cancel button
1006 edit button
1101 specimen information memory
1102 analysis request information memory
1103 error detection unit
1104 remaining time information acquisition unit
1105 analysis module load information memory
1106 specimen rack retrieval condition determination unit
1107 analysis module control unit
1108 conveyance module control unit
1109 control unit

The invention claimed is:

1. An automatic analysis device comprising:
a conveyance line through which a specimen rack is conveyed on which a plurality of specimen containers are mounted, each specimen container accommodating a specimen to be analyzed;
a dispensing mechanism configured to dispense the specimens from the plurality of specimen containers;
one or more dispensing lines on which the specimen rack is conveyed in and out from one end and conveyed to a dispensing position at which the specimens are dispensed from the specimen containers by the dispensing mechanism;
a rack standby unit having a slot in which the specimen rack is mountable, and configured to transfer the specimen rack between one end of the conveyance line and one end of the one or more dispensing lines;
an identification device configured to read information on the specimens in the specimen containers mounted on the specimen rack to be conveyed to the conveyance line;
a rack accommodating unit in which the specimen rack is accommodated at a position at which the specimen rack is removable; and
a control unit, wherein
the control unit is configured to
when there is an error in a respective specimen accommodated in a respective specimen container mounted on the specimen rack,
control the conveyance of the specimen rack based on information on the respective specimen in which the error occurs and information on other respective specimens accommodated in other respective specimen containers in the specimen rack on which the respective specimen container accommodating the respective specimen in which the error occurs is mounted, and a retrieval condition for retrieving a specimen rack in the rack accommodating unit, characterized in that when there is the error, the control unit is configured to obtain a remaining time which is a time required for processing on the other respective specimens accommodated in the other respective specimen containers in the specimen rack on which the respective sample container accommodating the respective specimen in which the error occurs is mounted, determine whether the obtained remaining time is within a preset allowable time range, and control the conveyance of the specimen rack based on a determination result and the retrieval condition.

2. The automatic analysis device according to claim 1, wherein
the error occurs based on a result of reading by the identification device or a result of dispensing by the dispensing mechanism.

3. The automatic analysis device according to claim 1, wherein
the control unit is configured to
when the obtained remaining time is not within the preset allowable time range, retrieve the specimen rack in the rack accommodating unit at a time point when the error occurs.

4. The automatic analysis device according to claim 1, wherein
the control unit is configured to
when there is the error in the respective specimen accommodated in the respective specimen container mounted on the specimen rack as a result of the reading by the identification device and the obtained remaining time is within the preset allowable time range, convey the specimen rack to the one or more dispensing lines.

5. The automatic analysis device according to claim 1, wherein
the control unit is configured to
when there is the error in the respective specimen accommodated in the respective specimen container mounted on the specimen rack as a result of the dispensing by the dispensing mechanism and the obtained remaining time is within the preset allowable time range, continue dispensing of a specimen accommodated in the other respective specimen containers in the specimen rack.

6. The automatic analysis device according to claim 1, wherein
the control unit is configured to
obtain the remaining time based on at least a number of analysis items requested for the other respective specimens accommodated in the other respective specimen containers and a time required for dispensing the other respective specimens accommodated in the other respective specimen containers by the dispensing mechanism.

7. The automatic analysis device according to claim 6, wherein
when there are a plurality of dispensing lines,
the control unit is configured to
obtain the remaining time further based on a time required for moving the specimen rack from one of the one or more dispensing lines to another one of the one or more dispensing lines via the specimen rack standby unit among the plurality of dispensing lines.

8. The automatic analysis device according to claim 1, wherein
the control unit is configured to
when there is the error,
determine whether patient information of the respective specimen in which the error occurs is the same as patient information of the other respective specimens accommodated in the other respective specimen containers in the specimen rack on which the respective sample container accommodating the respective specimen in which the error occurs is mounted, and when the patient information are the same,
obtain a remaining time which is the time required for processing on the other respective specimens accommodated in the other respective specimen containers in the specimen rack on which the respective sample container accommodating the respective specimen in which the error occurs is mounted, determine whether the obtained remaining time is within the preset allowable time range, and control the conveyance of the specimen rack based on the determination result and the retrieval condition.

9. The automatic analysis device according to claim 1, further comprising:
at least two analysis units each including one of the one or more dispensing lines and configured to analyze a component contained in the specimens, wherein
the control unit is configured to
when there is the error in the respective specimen accommodated in the respective specimen container mounted on the specimen rack as a result of dispensing by a respective dispensing mechanism, determine whether an analysis request for the other respective specimens accommodated in the other respective specimen containers in the specimen rack on which the respective sample container accommodating the respective specimen in which the error occurs is mounted is a request for the at least two analysis units, and when the analysis request is the request for the at least two analysis units, obtain a remaining time, in one of the at least two analysis units in which the dispensing is being performed, which is the time required for processing on the other respective specimens accommodated in the other respective specimen containers in the specimen rack on which the respective sample container accommodating the respective specimen in which the error occurs is mounted, determine whether the obtained remaining time is within the preset allowable time range, and control the conveyance of the specimen rack based on the determination result and the retrieval condition.

10. The automatic analysis device according to claim 8, wherein
the control unit is configured to when the patient information of the other respective specimens is not the same as the patient information of the respective specimen in which the error occurs, convey the specimen rack to the one or more dispensing lines.

11. The automatic analysis device according to claim 1, wherein
the control unit is configured to
when there is the error, and
when the other respective specimens accommodated in the other respective specimen containers in the specimen rack on which the respective sample container accommodating the respective specimen in which the error occurs is mounted is an urgent specimen, control the conveyance of the specimen rack so as to prioritize analysis of the urgent specimen without retrieving the specimen rack in the rack accommodating unit at a time point when the error occurs.

12. The automatic analysis device according to claim 1, wherein
the control unit is configured to
when there is the error, and
when re-inspection is set for the other respective specimens accommodated in the other respective specimen containers in the specimen rack on which the respective sample container accommodating the respective specimen in which the error occurs is mounted,
control the conveyance of the specimen rack so as to prioritize analysis of the other respective specimens for which the re-inspection is set without retrieving the specimen rack in the rack accommodating unit at a time point when the error occurs.

13. A specimen conveyance method using an automatic analysis device,
the automatic analysis device including:
a dispensing mechanism configured to dispense a specimen to be analyzed from a plurality of specimen containers which are mounted on a specimen rack and in which the specimen is accommodated;
an identification device configured to read information on the specimens in the specimen containers;
a rack accommodating unit in which the specimen rack on which the specimen containers are mounted is accommodated at a position at which the specimen rack is removable; and
a control unit,
the specimen conveyance method comprising:
causing the control unit to
when there is an error in a respective specimen accommodated in a respective specimen container mounted on the specimen rack,
control the conveyance of the specimen rack based on information on the respective specimen in which the error occurs and information on other respective specimens accommodated in other respective specimen containers in the specimen rack on which the respective specimen container accommodating the respective specimen is mounted, and a retrieval condition for retrieving the specimen rack in the rack accommodating unit, characterized in that when there is the error, the control unit is configured to obtain a remaining time which is a time required for processing on the other respective specimens accommodated in the other respective specimen containers in the specimen rack on which the respective sample container accommodating the respective specimen in which the error occurs is mounted,
determine whether the obtained remaining time is within a preset allowable time range, and
control the conveyance of the specimen rack based on a determination result and the retrieval condition.

14. The specimen conveyance method according to claim 13, wherein
the error occurs based on a result of reading by the identification device or a result of dispensing by the dispensing mechanism.

* * * * *